(12) United States Patent  (10) Patent No.: US 7,639,670 B2
Yamamoto  (45) Date of Patent: Dec. 29, 2009

(54) BROADCAST FAX TRANSMISSION SYSTEM

(75) Inventor: Kiyoko Yamamoto, Osaka (JP)

(73) Assignee: Fujitsu Limited, Kawasaki (JP)

( * ) Notice: Subject to any disclaimer, the term of this patent is extended or adjusted under 35 U.S.C. 154(b) by 455 days.

(21) Appl. No.: 11/149,034

(22) Filed: Jun. 9, 2005

(65) Prior Publication Data

US 2006/0013244 A1    Jan. 19, 2006

Related U.S. Application Data

(63) Continuation of application No. PCT/JP03/05273, filed on Apr. 24, 2003.

(51) Int. Cl.
*H04L 12/66* (2006.01)

(52) U.S. Cl. .................. 370/352; 370/401; 358/400

(58) Field of Classification Search ................ None
See application file for complete search history.

(56) References Cited

U.S. PATENT DOCUMENTS

| | | | | |
|---|---|---|---|---|
| 6,085,101 | A * | 7/2000 | Jain et al. | 455/500 |
| 6,463,135 | B2 * | 10/2002 | Abrishami et al. | 379/100.01 |
| 6,535,906 | B1 * | 3/2003 | Barber et al. | 709/200 |
| 7,142,550 | B1 * | 11/2006 | Umansky | 370/401 |
| 7,193,739 | B2 * | 3/2007 | Mundra et al. | 358/1.15 |
| 7,224,491 | B2 * | 5/2007 | Shinchi et al. | 358/400 |
| 7,280,239 | B2 * | 10/2007 | Sekiguchi | 358/1.15 |
| 2002/0105955 | A1 * | 8/2002 | Roberts et al. | 370/401 |

FOREIGN PATENT DOCUMENTS

| | | |
|---|---|---|
| JP | 10-136019 | 5/1998 |
| JP | 2000-267955 | 9/2000 |
| JP | 2001-156847 | 6/2001 |
| JP | 2001-339569 | 12/2001 |
| JP | 2002-111941 | 4/2002 |
| JP | 2003-008820 | 1/2003 |

OTHER PUBLICATIONS

International Search Report dated Aug. 5, 2003.

* cited by examiner

*Primary Examiner*—Phirin Sam
(74) *Attorney, Agent, or Firm*—Fujitsu Patent Center

(57) ABSTRACT

A broadcast FAX transmission system for broadcasting FAX data from a transmitting-side FAX device to a plurality of a receiving-side FAX device, comprising: a transmitting-side virtual FAX device receiving, from the transmitting-side FAX device, information related to a FAX communication to broadcast FAX data from a transmitting-side FAX device to the plurality of receiving-side FAX device; a generating unit generating an IP multicast packet containing the information related to the FAX communication; and a relay unit transmitting the IP multicast packet to a multicast group in which a plurality of receiving-side virtual FAX devices for transmitting the FAX data to the plurality of receiving-side FAX devices has been participating.

5 Claims, 9 Drawing Sheets

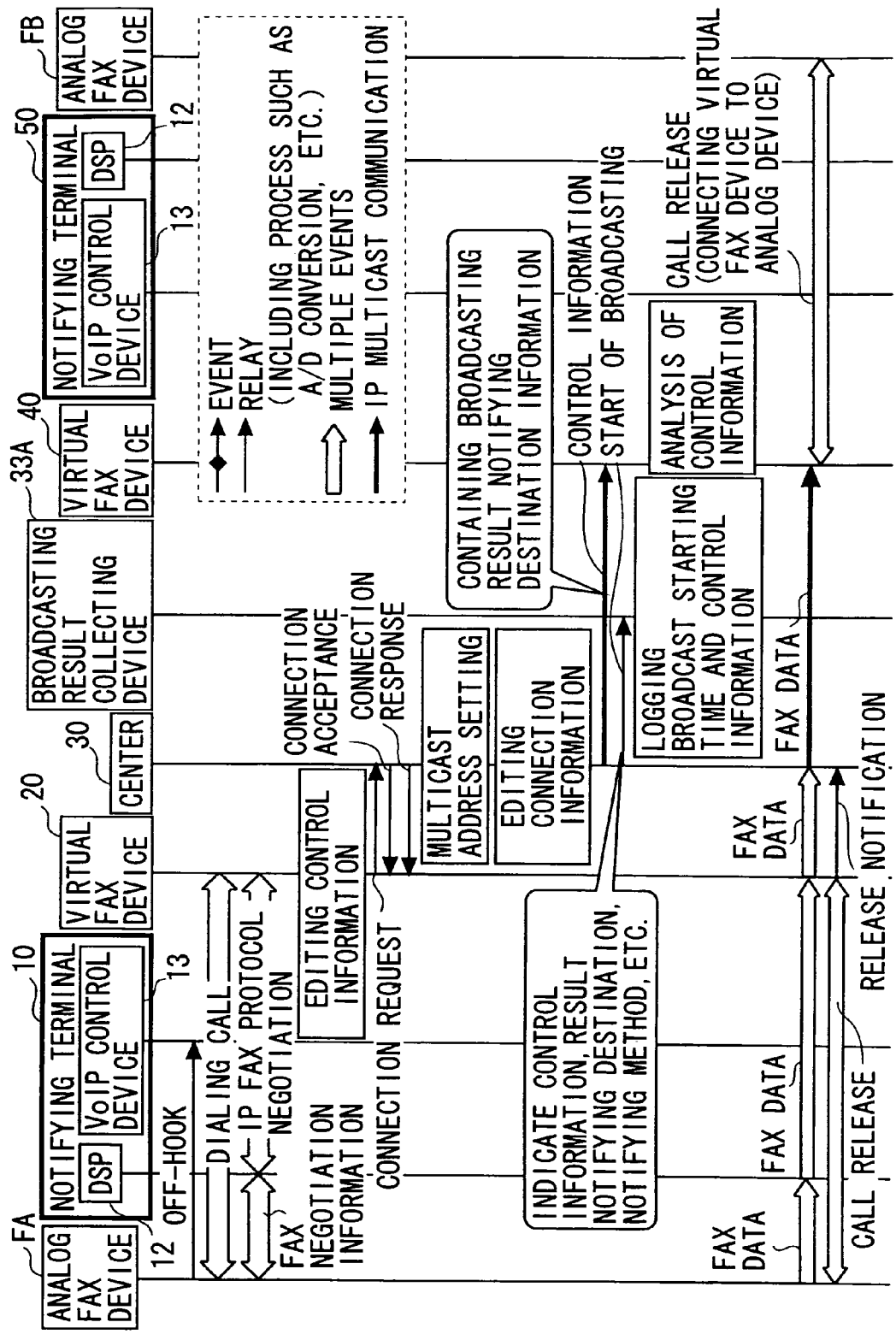

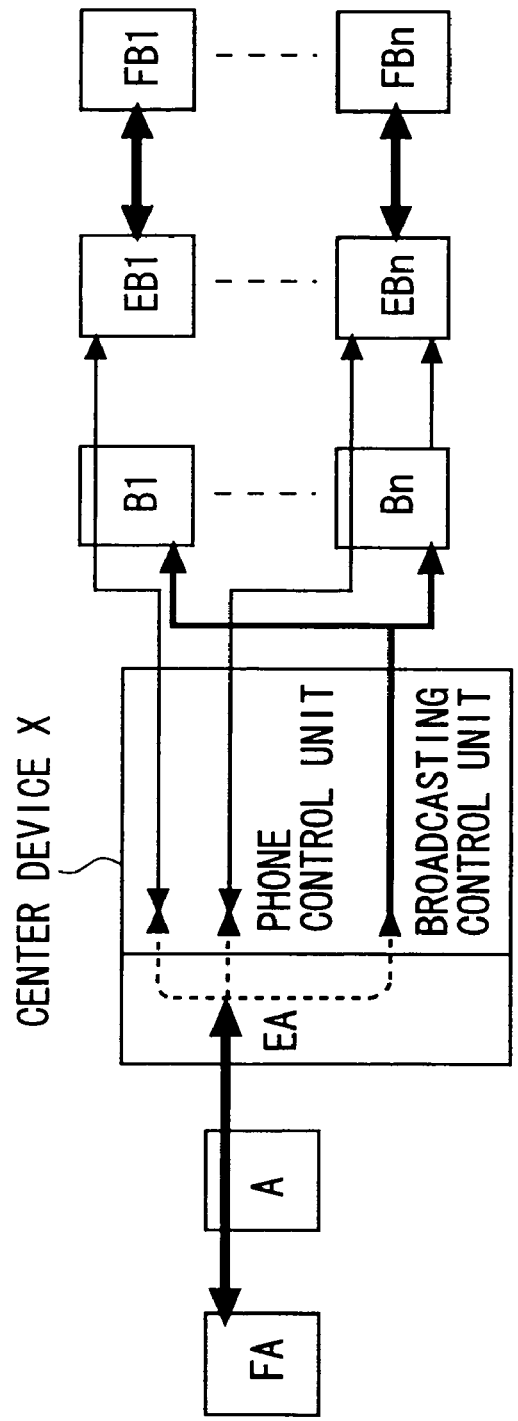

BROADCAST FAX TRANSMISSION SYSTEM

CROSS-REFERENCE TO RELATED APPLICATION

This application is a continuation of International Application PCT/JP2003/005273, filed on Apr. 24, 2003, the contents of which are herein wholly incorporated by reference.

BACKGROUND OF THE INVENTION

The present invention relates to a system having a VoIP (Voice over IP) function including a broadcasting function and a FAX (Facsimile) communication function based on a multicast that employs an IP (Internet Protocol) network.

FIG. 8 is a diagram showing an example of architecture of a conventional broadcast FAX transmission system. The FAX system shown in FIG. 8 actualizes, as follows, 1-to-n FAX communications between a transmitting (calling) terminal (FAX phone FA) and receiving (called) terminals (FAX phones FB (FB1, FB2, . . . , FBn; n is a natural number).

(1) 1-to-1 FAX communications are performed between the transmitting terminal (FAX phone FA) and a simultaneous broadcast FAX device EA via a notifying terminal A.

(2) 1-to-n FAX communications are performed between the simultaneous broadcast FAX device EA and a plurality of simultaneous broadcast FAX devices EB (EB1, EB2, . . . , EBn) via corresponding notifying terminals B (B1, B2, . . . , Bn).

(3) 1-to-1 FAX communications are performed between each simultaneous broadcast FAX device EB and the corresponding receiving terminal (FAX phone FB).

Operations shown in (1) and (3) given above are operations related to the normal FAX communications. By contrast, the operation in (2) is actualized by the simultaneous broadcast FAX device EA that separates and integrates the FAX information. The simultaneous broadcast FAX device EA separates pieces of information required for the FAX communications into signal information and data information. The separated data information has the following characteristics.

<1> The signal information is carried through bidirectional communications between transmitting/receiving sides of the data information, and involves confirming the transmission (acknowledgment of transmission). If unable to transmit the signal information, the communications are not established.

<2> The data information is carried through unidirectional communication from the transmitting side to the receiving side and does not involve confirming the transmission. If unable to transmit the data information, this causes only a deficiency of data but does not affect the communications on the whole.

A flow for actualizing the operation in (2) is given as follows.

[1] The simultaneous broadcast FAX device EA sets, by use of a phone function (phone control unit) possessed by a center device X, a signal information transfer path, one by one, between the respective simultaneous broadcast FAX devices EB1, EB2, . . . , EBn.

[2] When the signal information transfer paths for all the simultaneous broadcast FAX devices can be connected, the simultaneous broadcast FAX device EA flows, by use of a broadcasting function possessed by the center device X, the data information by broadcast.

[3] The data information distributed by the broadcasting function is received by the respective notifying terminals B1-Bn. The notifying terminals B1-Bn notify the corresponding simultaneous broadcast FAX devices EB1-EBn of the data information as voice information by use of external amplifier connecting terminals.

[4] The signal information transfer paths are released (disconnected) as triggered by completion of distributing the data information.

Each of the simultaneous broadcast FAX devices EB1-EBn has a bidirectional relay function. The simultaneous broadcast FAX devices EB1-EBn operate as below.

1) The simultaneous broadcast FAX device EB integrates the information sent in the form being separated into the signal information and the data information from the simultaneous broadcast FAX device EA, and sends the integrated information to the corresponding FAX phone FB.

2) The simultaneous broadcast FAX device EB sends transmission signal information from the FAX phone FB to the simultaneous broadcast FAX device EA via the signal information transfer path set in the actualization flow [1].

Note that a broadcasting system using the IP multicast is disclosed in Patent document 1 as the prior art related to the invention of the present application.

[Patent document 1] Japanese Patent Application Laid-Open Publication No. 2001-156847

The prior art given above has, however, the following problems.

First, the number of FAX recipients capable of receiving information distributed by the broadcast depends on ability to perform of the center device X including a simultaneous broadcast device, a phone control unit and a broadcasting control unit as shown in FIG. 8 and on the number of telephone lines.

Second, the simultaneous broadcast FAX device EA in the center device X and the simultaneous broadcast FAX device EB shown in FIG. 8 are high-cost and special devices that separate analog signals. Therefore, in the case of making modifications for enabling the IP-based communications to be performed between the center device X and the notifying terminals Bn, it is required that these devices are modified so that these devices support the IP.

Third, in the system shown in FIG. 8, between the center device X and the simultaneous broadcast FAX devices EBn, the normal phone connections are established and only the unidirectional data communications from the center to the receiving devices are conducted. Hence, it is difficult for the transmitting side to grasp which receiving device could actually receive FAX.

SUMMARY OF THE INVENTION

It is one object of the present invention to provide a broadcast FAX transmission system capable of easily changing FAX recipients capable of receiving broadcast transmission.

It is another object of the present invention to provide a broadcast FAX transmission system that can be easily configured.

It is a further object of the present invention to provide a broadcast FAX transmission system capable of transmitting a result of FAX transmission to a FAX device as a transmission source.

A broadcast FAX transmission system for broadcasting FAX data from a transmitting-side FAX device to a plurality of receiving-side FAX devices according to the present invention comprises: a transmitting-side virtual FAX device receiving, from the transmitting-side FAX device, information related to a FAX communication for broadcasting the FAX data to the plurality of receiving-side FAX devices; a generating unit generating an IP (Internet Protocol) multicast packet containing the information related to the FAX communication; and a relay unit transmitting the IP multicast packet to a multicast group in which a plurality of receiving-side virtual FAX devices for transmitting the FAX data to the plurality of receiving-side FAX devices has been participating.

According to the present invention, the IP packet containing the information related to the FAX communication that is received by the transmitting-side virtual FAX device is received by each of the plurality of receiving-side virtual FAX devices by the IP multicasting. Thus, one-to-many FAX communications are performed through the relay using the IP multicasting. Accordingly, it is possible to flexibly correspond to an increase in the number of destinations of the FAX communication (recipients of the FAX data).

Further, the information related to the FAX communication is relayed to the plurality of receiving-side virtual FAX devices, and hence the system can be actualized by employing comparatively low-cost IP devices without using high-cost special devices as explained in the prior art. Therefore, the system can be easily configured.

Preferably, the generating unit according to the present invention generates, based on the information related to the FAX communications, an IP multicast packet containing control information containing information used for the transmitting-side virtual FAX device to control the plurality of receiving-side virtual FAX devices and an IP multicast packet containing FAX data to be transmitted from the transmitting-side FAX device to the plurality of receiving-side FAX devices, and the relay unit transmits the IP multicast packets generated by the generating unit to the plurality of receiving-side virtual FAX devices.

Moreover, preferably, the transmitting-side virtual FAX device stores the FAX data to be transmitted from the transmitting-side FAX device to the plurality of receiving-side FAX devices, sets a call for transmitting the FAX data between the transmitting-side virtual FAX device and the plurality of receiving-side virtual FAX devices, and notifies the plurality of receiving-side virtual FAX devices of size information of the stored FAX data, the generating unit generates one or more IP multicast packets for transferring the stored FAX data, the relay unit transmits the one or more IP multicast packets generated by the generating unit to the plurality of receiving-side virtual FAX devices, and the transmitting-side virtual FAX device retransmits one or more IP packets including the FAX data in response to a FAX data retransmission request sent from each of the plurality of receiving-side virtual FAX devices in which judges that a size of the FAX data obtained from the one or more IP multicast packets is not coincident with the size indicated by the size information.

Still further, the transmitting-side virtual FAX device, as the transmitting-side FAX device receives information related to a result of the FAX communication via a result notifying unit, notifies the plurality of receiving-side virtual FAX device of information for transmitting, to the result notifying unit, the information related to the result of the FAX communication transmitted the plurality of receiving-side virtual FAX devices and the plurality of receiving-side FAX devices, the information related to the result of the FAX communication being obtained in the plurality of receiving-side virtual FAX device.

Yet further, a broadcast FAX transmission system from broadcasting FAX data from a transmitting-side FAX device to a plurality of receiving-side FAX device according to the present invention comprises: a gateway device terminating a FAX communication for transmitting the FAX data with a transmitting-side FAX device and converting the analog FAX communication into an IP-FAX communication; a transmitting-side virtual FAX device terminating the IP-FAX communication converted by the gateway device and converting the IP-FAX communication into an IP communication; and a relay device converting a destination address of an IP packet obtained through the IP communication converted by the transmitting-side virtual FAX device into an IP multicast address of a multicast group in which a plurality of receiving-side virtual FAX devices for transmitting the FAX data to the plurality of receiving-side FAX device has been participating, and sending the IP packet to the plurality of receiving-side virtual FAX devices.

BRIEF DESCRIPTION OF THE DRAWINGS

FIGS. 6A and 6B are sequence diagrams showing a modified example of the embodiment;

FIG. 8 is an explanatory diagram of the prior art.

DETAIL DESCRIPTION OF THE PREFERRED EMBODIMENTS

Embodiments of the present invention will hereinafter be described. The following embodiments are exemplifications, and configurations of the present invention are not limited to configurations in the embodiments.

Outline of Embodiment

The present embodiment actualizes a simultaneous broadcast Fax system using an IP network, wherein a virtual FAX device as a substitute for special devices such as the simultaneous broadcast FAX transmitting device EA and the simultaneous broadcast FAX receiving device EB as explained in the Background Arts, is interposed between a notifying terminal and a center server for broadcasting.

The virtual FAX device has a linkage function between FAX communications employing VoIP and a broadcasting function using IP multicast.

Figure 1:
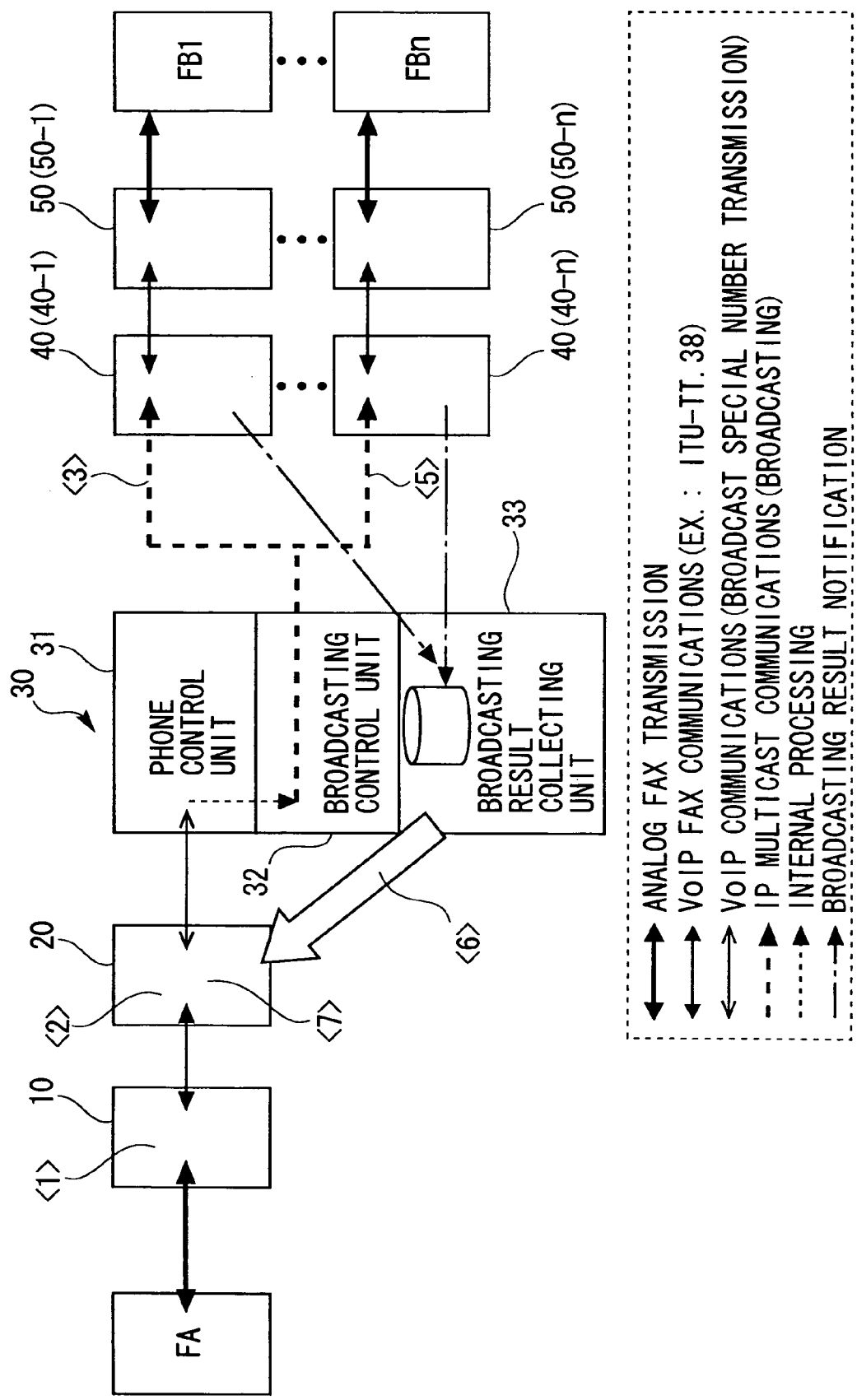
FIG. 1 is a diagram showing an example of a whole architecture of a broadcast FAX transmission system according to an embodiment.

FIG. 1 is a diagram showing an example of architecture of the simultaneous broadcast FAX system that uses an IP-based notifying terminal.

The simultaneous broadcast FAX system shown in FIG. 1 is a system for being simultaneously broadcasting FAX data to a plurality of FAX terminals FB (FB1, FB2, ..., FBn) from a FAX terminal (which might also be referred to as a "FAX device" or a "FAX phone") FA.

This FAX system includes a VoIP-TA (VoIP-Terminal Adapter; VoIP terminal) 10 installed with a FAX-function that performs 1-to-1 analog FAX communications with the FAX terminal FA, a virtual FAX terminal 20 for performing 1-to-1

VoIP FAX communications (based on, e.g., ITU-T.38) with the VoIP terminal 10, a center server 30 for broadcasting that performs 1-to-1 VoIP communications (broadcast special number communications) with the virtual FAX terminal 20, a plurality of FAX terminals 40 (40-1, 40-2, . . . , 40-n) each provided for every FAX terminal FB and receiving information transferred through the IP multicast communications (broadcasting) from the center server 30, and a plurality of FAX-function installed VoIP-TAs (VoIP terminals) 50 (50-1, 50-2 . . . , 50-n) each provided for every FAX terminal FB and performing the 1-to-1 VoIP FAX communications with the virtual FAX terminal 40 corresponding thereto, wherein each of the FAX terminals FB performs the 1-to-1 analog FAX communications with the corresponding VoIP terminal 50.

For example, notifying terminals are applied as the VoIP terminals 10 and 50. The VoIP terminals 10 and 50 might be referred to as the "notifying terminal 10" and the "notifying terminal 50," respectively.

The virtual FAX terminal 20, the center server 30 and each virtual FAX terminal 40 are connected to an IP network. The center server 30 includes a phone control unit 31 that conducts the 1-to-1 VoIP communications with the virtual FAX terminal 20, a broadcasting control unit 32 for simultaneously broadcasting (for performing IP multicast) information acquired by the phone control unit 31 through the VoIP communications with the virtual FAX terminal 20 to the respective virtual FAX devices 40, and a broadcasting result collecting unit 33 for collecting pieces of information related to broadcasting results given from the respective virtual FAX devices 40 and notifying the virtual FAX device 20 of the collected information.

The notifying terminal 10 converts the analog FAX communication with the FAX terminal 10 into an IP-FAX communication (e.g., ITU-T T.38, etc.) and starts the FAX communication addressed to a special phone number indicating a simultaneous broadcast FAX function (FIG. 1; <1>).

This special phone number indicates the simultaneous broadcast FAX to the respective notifying terminals B1-Bn defined as destinations of the broadcast communications via the center server 30. An IP address of the virtual FAX terminal 20 is designated as an IP destination address of the IP-FAX communications at that time.

The virtual FAX terminal 20, when receiving the information related to the IP-FAX communication from the notifying terminal 10, calls a broadcast special phone number to the center server 30 on the basis of call setting information contained in this received information. Subsequently, the virtual FAX terminal 20, when connecting to the center server 30 by calling the broadcast special phone number, converts a destination address (an IP destination address) of an IP-packetized FAX data that is contained in the received information from the notifying terminal 10 into an IP address of the center server 30, and sends the IP packet (FAX data) to the center server 30 (FIG. 1; <2>).

On the other hand, the center server 30 converts the destination address of the IP packet received from the virtual FAX terminal 20 into an IP multicast address for (performing the IP multicast) the virtual FAX terminals 40-1 through 40-n, and multicasts (performs the IP multicast of) the IP packet thereto. By this multicasting, 1-to-n IP packet (FAX data) relaying is thus conducted. FIG. 1 shows a 1-to-n relation of the IP multicast communications between the center server 30 and the virtual FAX terminals 4-1 through 40-n on the receiving side (FIG. 1; <3>).

The center server 30 is capable of making transparent user information in the originating (calling) information when establishing a broadcast special number connection as user information in broadcast start notifying information. Accordingly, the center server 30 does not have to be aware of whether the information sent by the IP multicast is the FAX data or not.

Each of the virtual FAX terminals 40-1 through 40-n, upon receiving broadcast start notification (which is also referred to as "an indication of start") of the communication from the center server 30, refers to the user information contained in the broadcast start notification, and does the FAX transmission based on the IP-FAX communication (VoIP FAX communication) to the corresponding notifying terminal 50 (any one of the notifying terminals 50-1 through 50-n) on the receiving side (FIG. 1; <4>).

Each of the notifying terminals B1-Bn functions as a gateway device between the IP-FAX communication and the analog FAX communication, and transmits the FAX data to the corresponding FAX terminal FB (any one of the FAX terminals FB1-FBn) through the analog FAX communication. Through this FAX communication, the FAX data sent from the FAX terminal FA reaches each of the FAX terminals FB and can be printed out on the side of each FAX terminal FB.

Each virtual FAX terminal 40, as triggered by an end of broadcast reception from the center server 30, notifies a result return destination indicated by the indication of start, of result information related to the FAX communication (FIG. 1; <5>).

At this time, each virtual FAX terminal 40, as pieces of result information, acquires, from the corresponding notifying terminal 50, information (appropriateness result information of FAX communication) about whether the FAX communication could be normally performed or not (a factor for abnormality (failure) if the abnormality (failure) occurs) as well as information about whether or not the IP multicast packet could be received from the center server 30 (broadcasting result information), and can notify of the acquired information as detailed information. In the example of the configuration in FIG. 1, a broadcasting result collecting unit 33 of the center server 30 is designated as the return destination of the result information.

The virtual FAX terminal 20 obtains the result information (FIG. 1; <6>). FIG. 1 exemplifies the configuration, wherein the virtual FAX terminal 20 obtains the result information accumulated (stored) on the broadcasting result collecting unit 33 of the center server 30 by referring to the result information by itself (spontaneously accessing the result information). An available configuration replacing the configuration given above is that a management unit of the result information (which is the broadcasting result collecting unit 33 in FIG. 1) may notify the transmitting-side virtual FAX terminal (the virtual FAX terminal 20) of the result information.

The virtual FAX terminal 20 sends by FAX the obtained result information in the form of character information to the transmitting-side FAX device FA via the notifying terminal 10 (FIG. 1; <7>). At this time, the notifying terminal 10 functions as a gateway device between the IP-FAX communication and the analog FAX communication in connection with the transmission of the result information.

Figure 2:
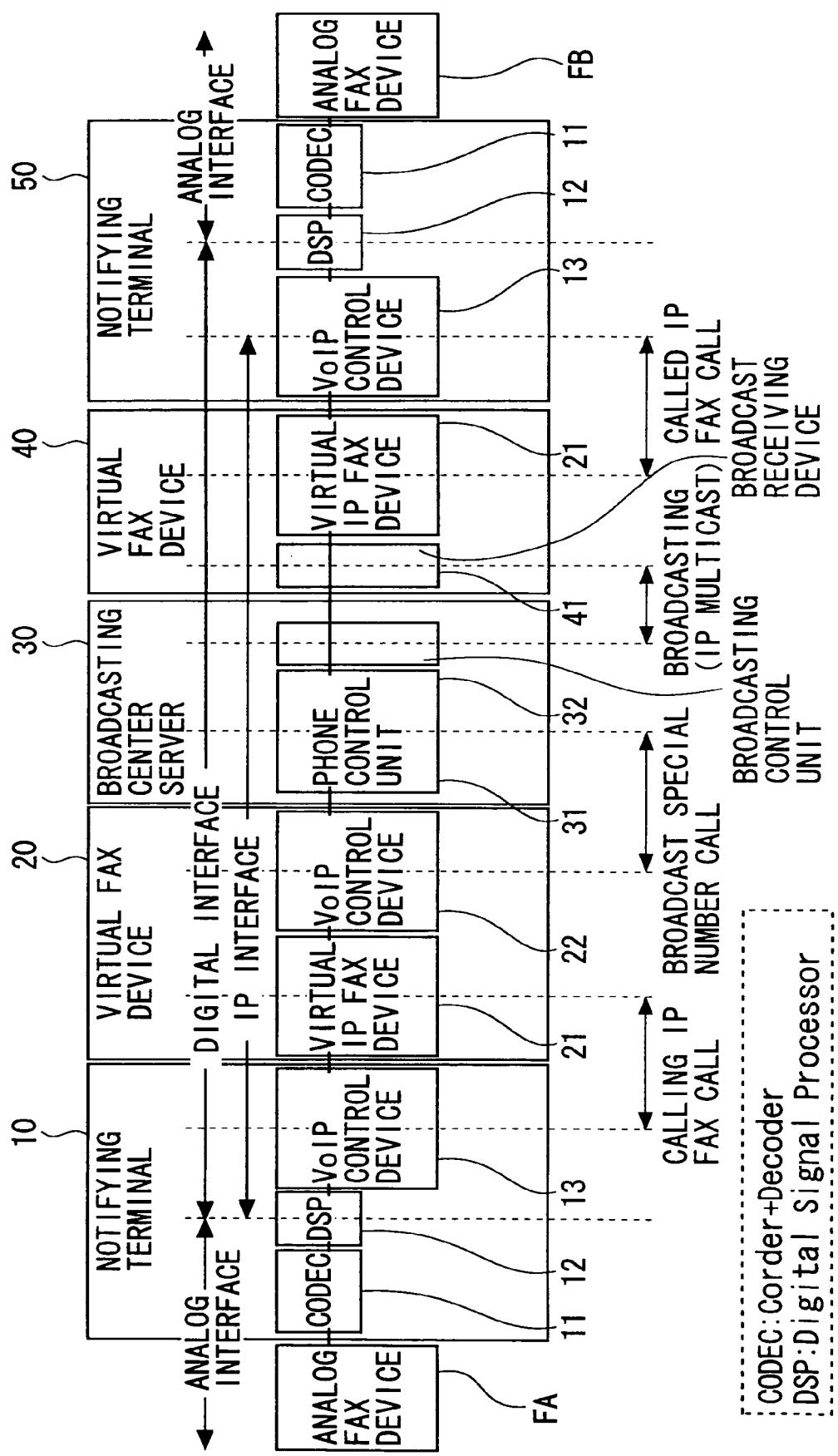
FIG. 2 is a diagram showing an example of constructions of a notifying terminal, a virtual FAX device and a center server shown in FIG. 1.

FIG. 2 is a diagram showing functional blocks of the notifying terminals 10 and 50, the virtual FAX devices 20 and 40, and the center server 30 in the simultaneous broadcast FAX system as shown in FIG. 1.

As illustrated in FIG. 2, the notifying terminal 10 is constructed as a device including a CODEC (coder+decoder) 11, a DSP (Digital Signal Processor) 12 and a VoIP control device (VoIP terminal device (VoIP-TA)) 13. The notifying terminal 50 has the same construction as the notifying terminal 10 has.

The virtual FAX device 20 on the transmitting side is constructed as a device including a virtual IP FAX device 21 and a VoIP control device (VoIP terminal device (VoIP-TA)) 22. On the other hand, the virtual FAX device 40 on the receiving side is constructed as a device including a broadcast receiving device 41 for receiving the IP multicast packet and the virtual IP FAX device 21.

The center server 30 is constructed as a device including a phone control unit (broadcast acceptance control unit) 31 and a broadcasting control unit (broadcast execution control unit) 32.

An originating (calling) IP FAX call based on the IP-FAX communications is established between the VoIP control device 13 of the notifying terminal 10 and the virtual IP FAX device 21 of the virtual FAX device 20. The virtual IP FAX device 21 terminates the originating IP FAX call.

Further, a VoIP call (broadcast special number originating (calling) call) that involves calling a broadcast special number through the VoIP communications is established between the VoIP control device 22 of the virtual FAX device 20 and the broadcast acceptance control unit 31 of the center server 30. The broadcast acceptance control unit 31 terminates the broadcast special number originating call.

Further, the broadcasting (IP multicast) is executed between the broadcast execution control unit 32 of the center server 30 and the broadcast receiving device 41 of each virtual FAX device 40.

Still further, a terminating (called) IP FAX call (IP-FAX call) based on the IP-FAX communications is established between the virtual IP FAX device 21 of each virtual FAX device 40 and the VoIP control device 13 of the corresponding notifying terminal 50 on the receiving side. The VoIP control device 13 of each notifying terminal 50 terminates the called IP FAX call.

Thus, the virtual FAX device 20 on the transmitting side has a function of linking the calling IP-FAX call to the broadcast special number calling call. On the other hand, the virtual FAX device 40 on the receiving side has the function of linking the reception of broadcasting based on the IP multicast from the center server 30 to the called IP-FAX call.

Figure 3:
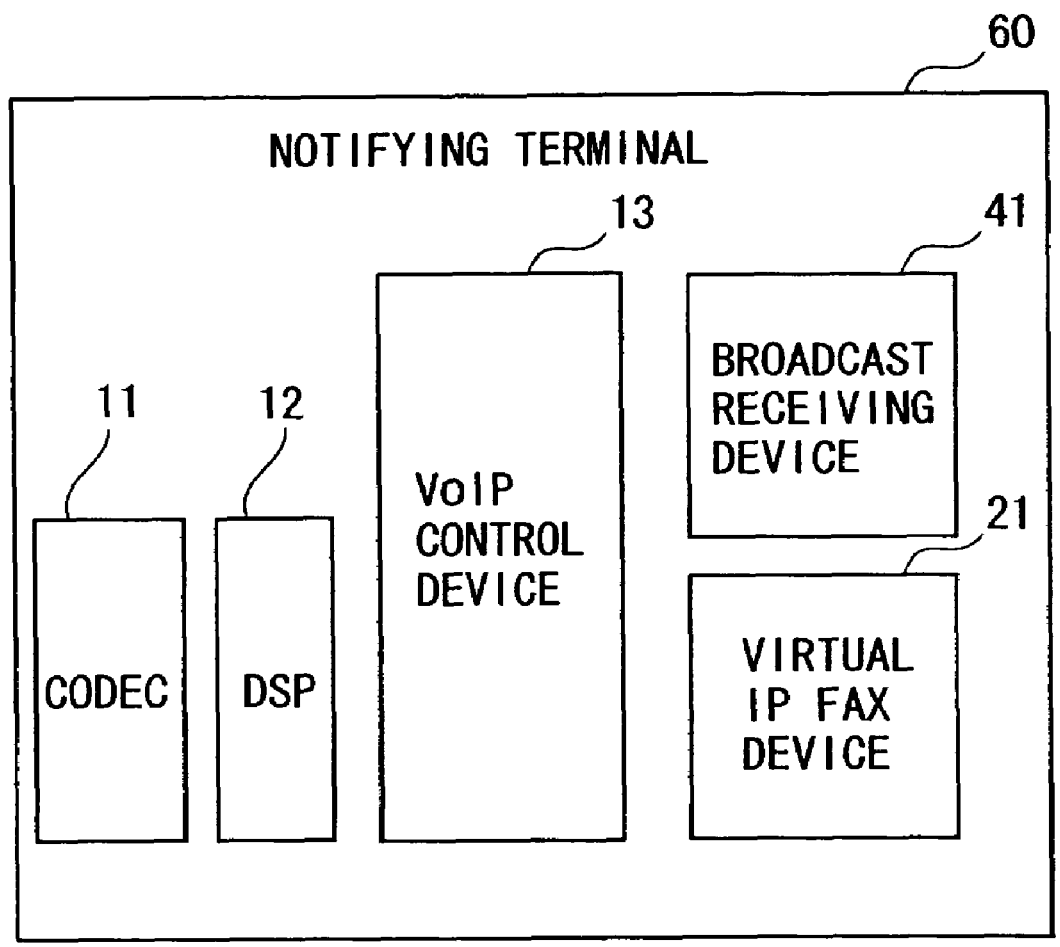
FIG. 3 is a diagram showing a modified example of the notifying terminal and a virtual FAX device.

The transmitting/receiving-side virtual FAX terminals can be actualized as independent devices as in FIG. 2. It must be, however, added that these virtual FAX terminals can be installed as one function of other device. FIG. 3 is a functional block diagram showing an example of a construction of a notifying terminal (notifying terminal 60) installed with the function of the virtual FAX terminal.

In the example shown in FIG. 3, the notifying terminal 60 is constructed as a device including, in addition to the components (the CODEC 11, the DSP 12 and the VoIP terminal (control) device 13) possessed by each of the notifying terminals 10 and 50 shown in FIG. 2, the virtual IP FAX device 21 provided in each of the virtual FAX terminals 20 and 50, and the broadcast receiving device 41 held by the virtual FAX terminal 50 on the receiving side. The notifying terminal 60 has, however, no necessity of including the broadcast receiving device 41 when applied as the transmitting-side notifying terminal.

Details of Embodiment

Figure 4:
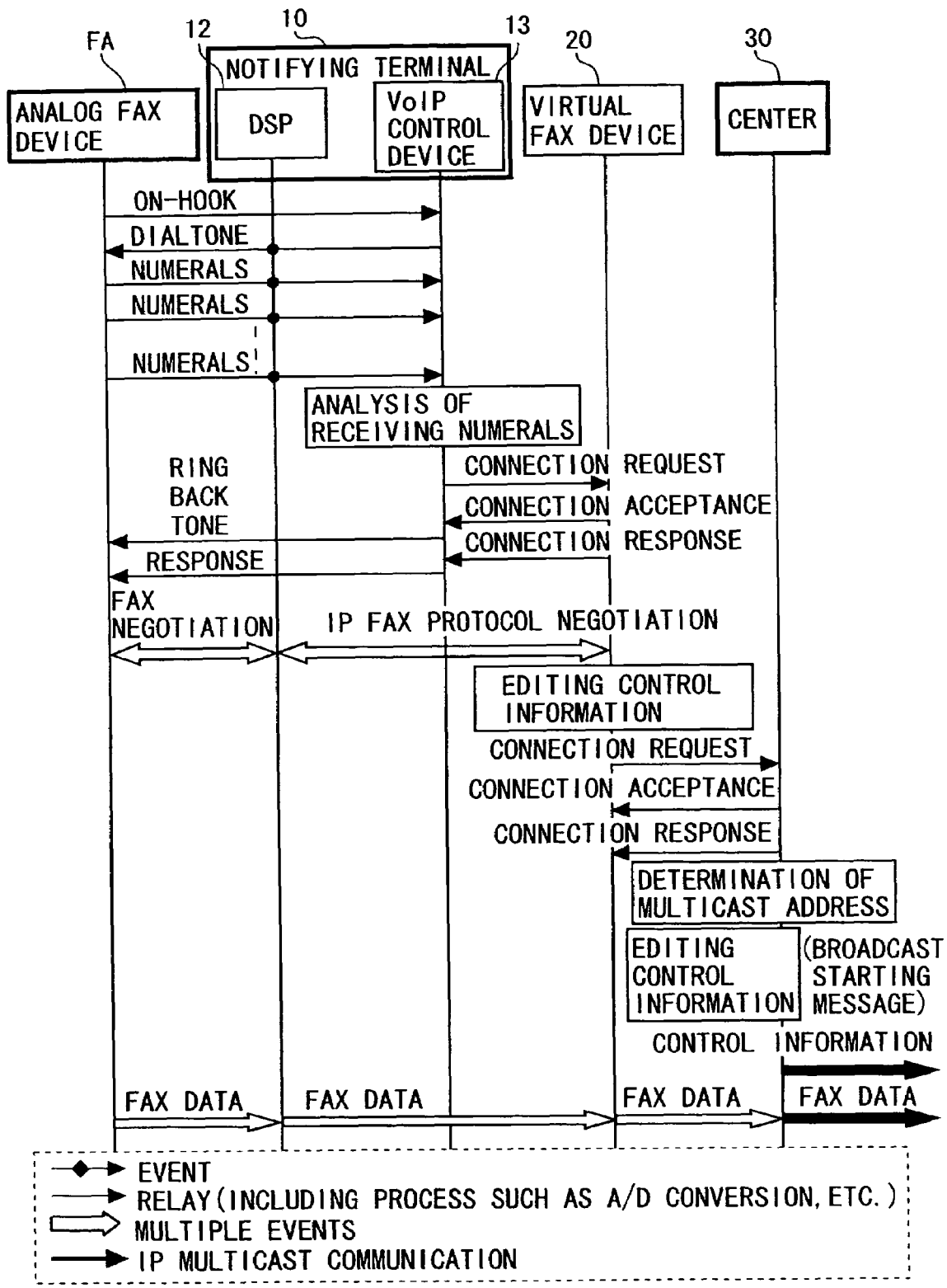
FIG. 4 is a sequence diagram showing an operational example of the broadcast FAX transmission system shown in FIG. 1.
Figure 5:
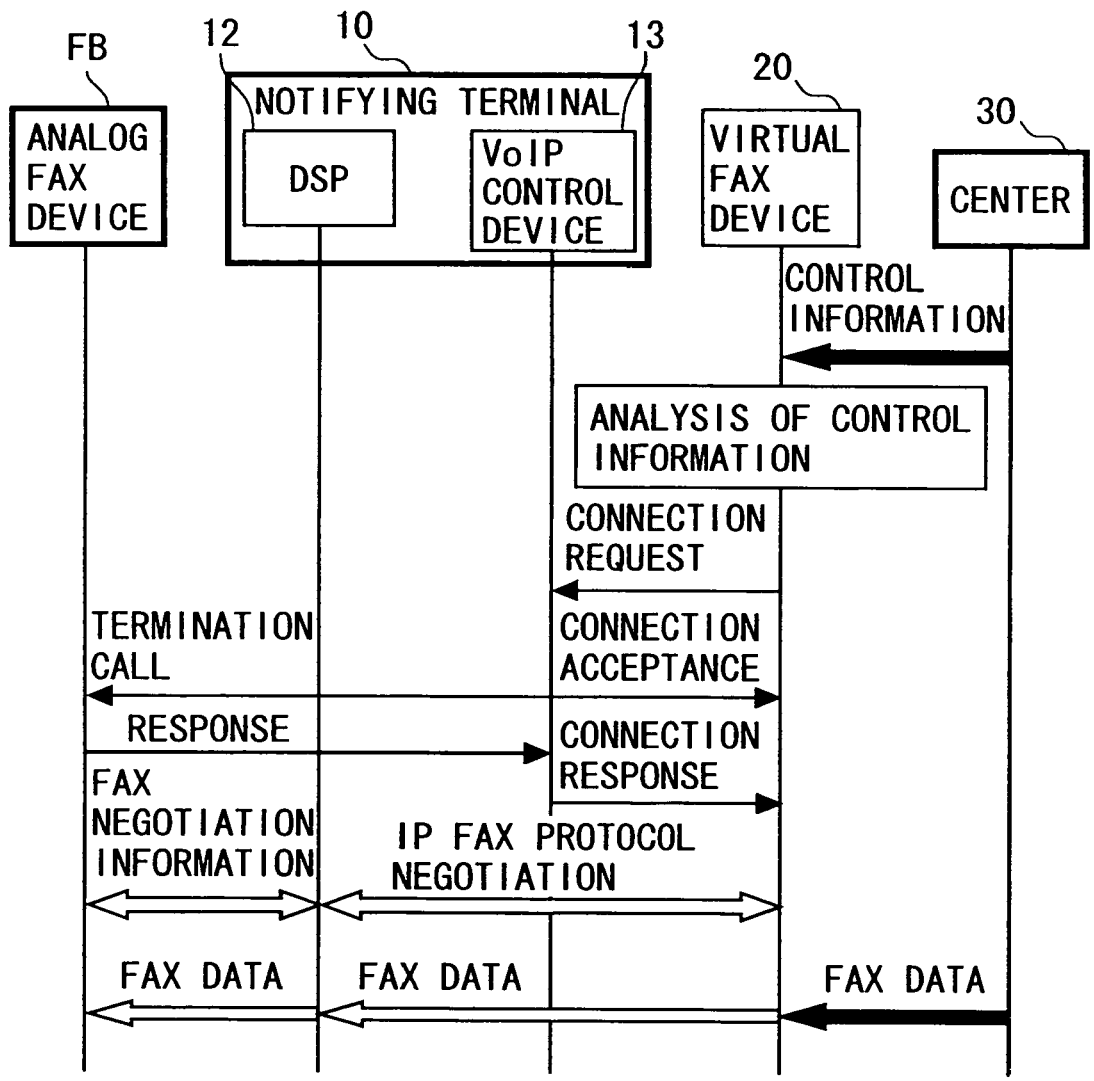
FIG. 5 is a sequence diagram showing an operational example of the broadcast FAX transmission system shown in FIG. 1.

Next, an in-depth description of the broadcast FAX transmission system will be given. FIG. 4 is a sequence diagram showing a processing flow of how the notifying terminal 10 shown in FIG. 2 links the originating IP-FAX call to the broadcast special number originating call. FIG. 5 is a sequence diagram showing a processing flow of how the notifying terminal 4 shown in FIG. 2 links the receipt of the IP multicast based broadcast to the receiving IP-FAX call.

In FIG. 4, in the case of broadcasting the FAX data from the FAX device FA to the plurality of FAX devices FB, a user of the FAX device FA inputs a predetermined broadcast FAX special number (e.g., #109999). Hereupon, the FAX device FA transmits an off-hook signal to the VoIP control device 13 of the notifying terminal 10 and, when receiving a dial tone signal from the VoIP control device 13, sends the broadcast FAX special number to the VoIP control device 13.

The VoIP control device 13 of the notifying terminal 10 executes a process of analyzing the received numerals and, when recognizing that a FAX number transmitted from the FAX device FA is identified with the broadcast FAX special number and that its recipient device is the virtual FAX device 20, calls up the recipient device.

To be specific, the VoIP control device 13 sends a connection request message of the originating IP-FAX call to (the virtual IP FAX device 21 of) the virtual FAX device 20. The connection request sent at this time contains the broadcast FAX special number "#109999" as it remains unchanged.

The virtual IP FAX device 21 of the virtual FAX device 20 behaves for the connection request message in the same way as the IP-FAX device does. Namely, the virtual FAX device 20 sends a connection acceptance message responding to the connection request message.

The VoIP control device 13, upon receiving a connection acceptance message from the virtual FAX terminal 20, transmits a ring back tone (Ring Back Tone) signal to the FAX device FA. Thereafter, the VoIP control device 13, when receiving the connection response message from the virtual FAX device 20, a response signal responding to the connection response message to the FAX device FA.

Thereafter, a negotiation with respect to the FAX transmission is conducted between the FAX device FA and the virtual FAX device 20 via the notifying terminal 10. Specifically, pieces of negotiation information regarding the analog FAX communications are exchanged by use of an analog interface between the FAX device 10 and the DSP 12 of the notifying terminal 10, and a negotiation based on the IP-FAX protocol (e.g., ITU-T T.38) is conducted through use of a digital interface between the DSP 12 and the virtual FAX device 20.

At this time, the virtual FAX device 20 stores information (negotiation information) related to the negotiation with the FAX device FA in an interface between virtual FAX devices (editing of control information).

The virtual FAX device 20, upon completion of the negotiation, executes a VoIP call connection process to the center server (center device) 30 by use of a predetermined broadcast special phone number (e.g., #119999) for the center server (center device) 30. A relationship between the broadcast FAX special number (#109999) and the broadcast special number (#119999) is registered beforehand in the virtual FAX device 20.

With this operation, the respective messages such as the connection request, the connection acceptance and the connection response are exchanged between (the VoIP terminal device 22 of) the virtual FAX device 20 and (the broadcast accept control unit 31 of) the center server 30, thereby setting a broadcast special number call. At this time, the connection request message sent from the virtual FAX device 20 to the center server 30 contains pieces of inter-virtual-FAX-device interface information (information containing a voice coding method, a variety of timing values, etc. and used for the transmitting-side virtual FAX device to control the receiving-side virtual FAX device).

The broadcast execution control unit 32 of the center server 30, when the broadcast special number call is set, uniquely determines an IP multicast address, which is prepared in advance, used for broadcasting with respect to at least one virtual FAX device as broadcasting targets, then edits the control information to be transmitted by the IP-multicast, and generates a broadcast start message (IP multicast packet) containing the control information. At this time, the broadcast start message contains the inter-virtual-FAX-device interface information which has been received from the virtual FAX device 20. Then, the broadcast execution control unit 32 sends the broadcast start message into the IP network.

Each of the virtual FAX terminals 40 is previously informed of the IP multicast address used by the center server 30 for the IP multicast. With this contrivance, each virtual FAX terminal 40 can receive, as a self-addressed message, the broadcast start message containing the control information. Thus, the broadcast start message is distributed to a host, i.e., each of the virtual FAX terminals 40 belonging to an IP multicast group.

In FIG. 5, in each of the virtual FAX devices 40, the broadcast receiving device 41 receives the broadcast start message, and the virtual IP FAX device 21 analyzes the control information contained in the broadcast start message. At this time, the virtual IP FAX device 21, when recognizing that the message contains the inter-virtual-FAX-device interface information given from the virtual FAX device 10, executes a connection process to the analog FAX phone (FAX terminal FB) in accordance with contents of the inter-virtual-FAX-device interface information.

To be specific, the virtual IP FAX device 21 of the virtual FAX device 40 sends a connection request message of the called IP-FAX call to the VoIP control device 13 of the corresponding notifying terminal 50. The VoIP control device 13, when receiving the connection request message, sends to the virtual IP FAX device 21 a connection acceptance message responding to the connection request message, and also sends a called message to the FAX device FB.

Herein, the virtual FAX device 40 is previously registered with an IP address of the corresponding notifying terminal 50 and a FAX number of the corresponding FAX device FB, and employs the IP address and the FAX number for the connection process of the FAX device FA.

The VoIP control device 13 of the notifying terminal 50, when receiving a response message responding to the called message from the FAX device FB, sends the connection response message back to the virtual IP FAX device 21 of the virtual FAX device 40.

When the called IP-FAX call is thus set, a negotiation related to the FAX communications is effected between the virtual IP FAX device 21 and the FAX device FB. Specifically, the IP-FAX protocol negotiation is conducted by use of a digital interface between the virtual IP FAX device 21 and the DSP 12 of the notifying terminal 50, and the FAX negotiation information is exchanged by use of an analog interface between the DSP 12 and the FAX device FB.

A path for broadcasting the FAX data respectively to the plurality of FAX devices FB from the FAX device FA, is generated in the way described above.

Referring back to FIG. 4, the FAX device FA, when coming to an end of the negotiation with the virtual FAX device 20, transmits the analog FAX data concerning the broadcasting. The analog FAX data is converted into the digital FAX data by the CODEC 11 and the DSP 12 of the notifying terminal 10, the digital FAX data is converted into an IP packet based on the VoIP, and the IP packet is transmitted as addressed to the virtual FAX device 20.

The virtual FAX device 20, when receiving the IP packet from the notifying terminal 10, converts an IP destination address in the IP packet into an IP address of the center server 30, and transmits the IP packet to the center server 30. The center server 30, when receiving the IP packet from the virtual FAX device 20, converts the IP destination address of the IP packet into an IP multicast address, and transmits the IP packet to the host of the IP multicast group, i.e., each of the virtual FAX devices 40.

In FIG. 5, each of the virtual FAX devices 40, when receiving the IP packet transmitted by the IP-multicast, converts the IP destination address of the IP packet into an IP address of the corresponding notifying terminal 50, and transmits the IP packet to the notifying terminal 50.

In each notifying terminal 50, upon receiving the IP packet, the VoIP control device 13 extracts the digital FAX data from the IP packet, and the DSP 12 and the CODEC 11 convert the digital FAX data into the analog FAX data, and transmits the FAX data to the corresponding FAX device FB.

Thus, the FAX data from the FAX device FA reaches the FAX device FB. The FAX device FB, when receiving the FAX data, can print out the FAX data (print-output to a sheet).

The broadcast FAX special number (broadcast FAX communication special number; e.g., #109999) is previously registered in each of the corresponding devices (the notifying terminal 10, the virtual FAX terminal 20) by a system administrator, and the system user (the user of the FAX device FA) is notified of the broadcast FAX special number.

The FAX sender (the user of the FAX device FA), in the case of desiring to transmit a certain piece of information by FAX to the plurality of (users of) FAX devices FB, transmits the information by FAX in a way that dials the broadcast FAX special number (linking) by use of the FAX device FA.

Hereafter, the same operation as the normal 1-to-1 FAX communication is performed between the FAX device FA and the virtual FAX device 10. Then, when the FAX call is established, the FAX device FA executes the process of transmitting the FAX data and, when finishing the transmission, disconnects the FAX call.

Note that the recipient of the FAX data (the user of the FAX device FB) does not have to be aware of whether or not the user utilizes the FAX transmission service by the broadcast FAX transmission system according to the embodiment.

Modified Example

The embodiment discussed above can be modified as follows.

In the embodiment, the notifying terminal 10 functioning as the gateway between the analog FAX communication and the IP-FAX communication is provided between the FAX device FA and the virtual FAX device 20. An available configuration as a substitute for the aforementioned configuration is that the notifying terminal 10 is omitted, the virtual FAX device 20 functions as the gateway between the analog FAX communication and the IP FAX communication, the IP-FAX communications are performed between the virtual FAX device 20 and the center server 30, the center server 30 terminates the IP-FAX communications, a destination address of the IP packet received from the virtual FAX device is converted into the IP multicast address, and the IP packet is thus transmitted. Similarly, there may be taken a configuration of omitting the notifying terminal 50 between the receiving-side virtual FAX device 40 and the analog FAX device FB and performing the analog FAX communications therebetween.

Figure 6B:
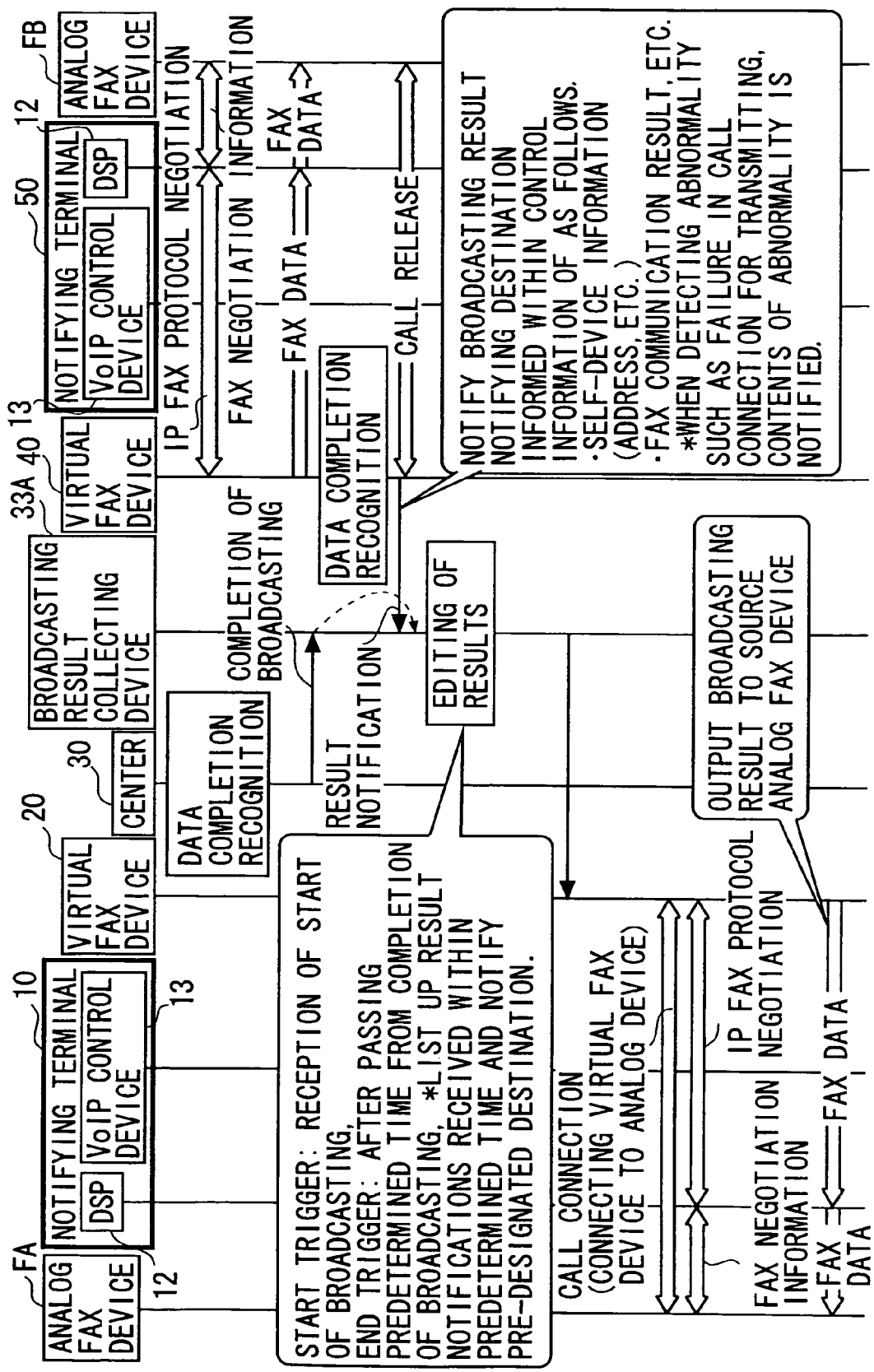

Moreover, the embodiment can be also modified as illustrated in FIGS. 6A and 6B. FIGS. 6A and 6B are sequence diagram showing a modified example of the embodiment. The embodiment discussed above adopts the configuration that the center server 30 includes the broadcasting result collecting unit 33. In this respect, the modified example takes such a configuration that the broadcasting result collecting unit 33 is constructed as a broadcasting result collecting device 33A independent of the center server 30, and the FAX device FA is notified of a result of the FAX communication.

In FIGS. 6A and 6B, the operation till the center server 30, by the IP-multicast, transmits the broadcast start message containing the control information to the IP network, is the same as in the embodiment discussed above. In the broadcast start message, however, the control information contains a piece of information indicating a broadcasting result notifying destination (broadcasting result notifying destination information; an IP address of the broadcasting result collecting device 33A).

Further, the center server 30, when the broadcast start message is transmitted by use of the IP-multicast, sends the broadcasting result collecting device 33A a broadcast start notification for instructing the control information, a result notifying destination and a notifying method.

The broadcasting result collecting device 33A, upon receiving the broadcast start notification, logs in broadcast start time and the control information.

Thereafter, the FAX device FA, when finishing the transmission of the FAX data, effects a call release between the virtual FAX terminal 20 and the FAX device FA itself. The virtual FAX device 20, upon an end of the call release, sends a release notification to the center server 30.

The center server 30, by receiving the release notification, makes data final recognition (recognizes completion of the FAX data transmission), and sends a broadcast completion notification to the broadcasting result collecting device 33A.

On the other hand, the virtual FAX device 40, when the FAX data transmission to the FAX device FB is completed, makes the data completion recognition. Thereafter, when the FAX device FB completes the reception of the FAX data, the call release is conducted between the virtual FAX device 40 and the FAX device FB.

The virtual FAX device 40, when the call release is completed, sends a result notification to the broadcasting result collecting device 33A. Namely, the virtual FAX device 40 transmits self-device information (e.g., an address of the virtual FAX device 40) and a result of the FAX transmission to the broadcasting result notifying destination (the broadcasting result collecting device 33A) contained in the control information received from the center server 30.

At this time, if the FAX transmission is normally completed, the virtual FAX device 40 notifies of the normal completion as a FAX transmission result. By contrast, if the virtual FAX device 40 detects abnormality (failures) such as a failure in the call connection for the FAX data transmission, the virtual FAX device 40 notifies of a content of the abnormality (failures) as a FAX transmission result.

The broadcasting result collecting device 33A, as triggered by receiving the broadcast start notification from the center server 30, starts collecting the result information (accepting the result notification) with respect to the FAX data transmission. Then, the broadcasting result collecting device 33A, when a predetermined period of time (a fixed period of time) elapses since the reception of the broadcast completion notification from the center server 30, finishes collecting the result information.

Then, the broadcasting result collecting device 33A executes a result editing process, wherein there are edited the broadcasting results (e.g., character information) containing listed-up result notifications that could be received during a result information collecting period. Subsequently, the broadcasting result collecting device 33A notifies a pre-designated destination of the edited broadcasting results. In the example shown in FIGS. 6A and 6B, the virtual FAX device 20 is designated as the destination of the broadcasting result notification.

The virtual FAX device 20, when receiving the broadcasting result notification from the broadcasting result collecting device 33A, establishes the call connection to and makes the negotiation with the FAX device FA. Then, when a transmission path for the FAX data is set, the virtual FAX device 20 transfers the broadcasting result notification by way of the FAX data to the FAX device FA.

Thus, the FAX device FA can receive the broadcasting result. The broadcasting result can be printed on the sheet or can be outputted to a display as the case may be. This enables the sender to recognize the result of transmitting the FAX data to the plurality of recipients.

Figure 7:
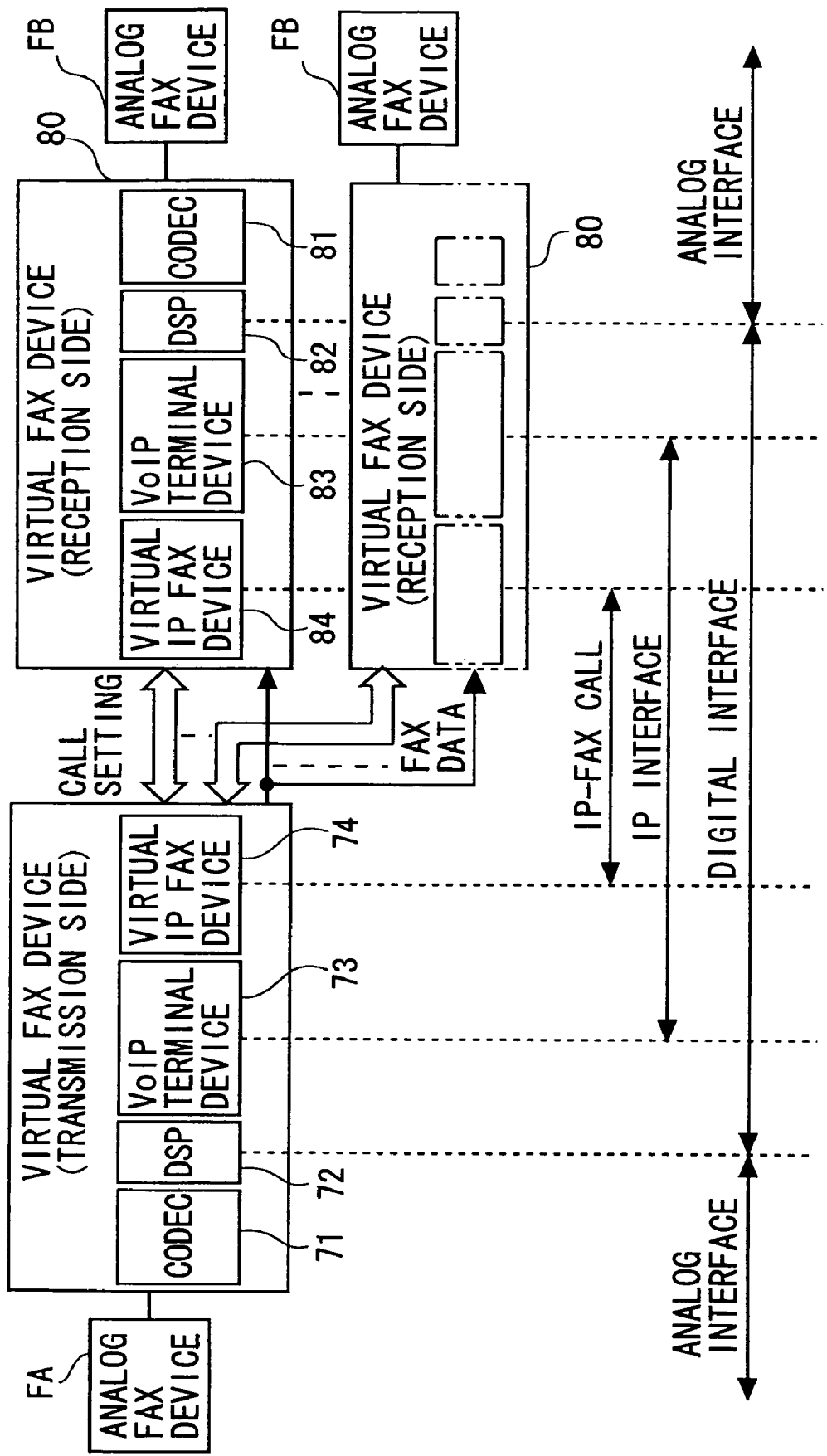
FIG. 7 is a sequence diagram showing a modified example of the embodiment.

Further, the embodiment discussed above can also be modified as below. To be specific, as shown in FIG. 7, the broadcast FAX transmission system includes a transmitting-side virtual FAX device 70 connected to the transmitting-side analog FAX device (FAX device FA), and a plurality of receiving-side virtual FAX devices 80 each prepared for each of a plurality of receiving-side analog FAX devices (FAX devices FB) and connected to the corresponding FAX device FB. The virtual FAX device 70 is connected via the IP network to the virtual FAX device 80.

The virtual FAX device 70 has a CODEC 71, a DSP 72, a VoIP terminal device 73 and a virtual IP FAX device 74. The virtual FAX device 80 has a CODEC 81, a DSP 82, a VoIP terminal device 83 and a virtual IP FAX device 84.

Functions of the respective components possessed by the virtual FAX devices 70 and 80 are substantially the same as the functions of the components possessed by the notifying terminal and the virtual FAX device in the embodiment discussed above. A modified example shown in FIG. 7, however, has the following difference.

The transmitting-side virtual FAX device 70 receives all the FAX data treated as transmission target data to the respective FAX devices FB from the FAX device FA, and stores the FAX data on an unillustrated storage area. Then, the virtual IP FAX device 74 of the virtual FAX device 70 establishes, based on the control information obtained from the VoIP terminal device 73, an IP-FAX call (e.g., ITU-T T.37) for every virtual FAX device 80 between the virtual IP FAX device 84 of each receiving-side virtual FAX device 80 and the virtual FAX device 70. At this time, the control information used for the virtual FAX device 70 to control the virtual FAX device 80, which is transferred to the virtual FAX device 80 from the virtual FAX device 70, contains size information showing a total data size of the accumulated (stored) transmission target FAX data.

Then, when the IP-FAX call is established between the virtual FAX device 70 and all the virtual FAX devices 80, the virtual IP FAX device 74 segments (divides) the accumulated FAX data into a proper size, thus generates IP packets each including the divided FAX data and sends the IP packets to the IP network as addressed to IP multicast addresses of an IP multicast group in which the respective virtual FAX devices 80 participate.

Each of the virtual FAX devices 80 receives the IP packets from the virtual FAX device 70, then assembles user data stored in the IP packets into the FAX data, and transmits the FAX data to the corresponding FAX device FB.

At this time, if a total data size of the assembled FAX data is smaller than a size indicated by the pre-notified size information, the virtual IP terminal 84 of the virtual FAX device 80 requests the virtual IP FAX device 74 to retransmit the FAX data. The virtual IP FAX device 74 is able to transmit, by unicast, the FAX data to the virtual IP FAX device 84 as a retransmission requester.

Thus, the information about the FAX transmission is accumulated on the transmitting side, thereby enabling the addition of the transmission information size of the information used for the transmitting-side virtual FAX device to control the receiving-side virtual FAX device and also enabling the receiving-side FAX device to output, if unable to acquire the information having the designated data size due to a receiving interruption caused by a fault on the transmission path, the proper information by prompting the receiving-side virtual FAX device to make the retransmission request.

It should be noted that the system shown in FIG. 7 can also take a configuration for transferring the information related to the FAX-communications to the receiving side in such a mode that the IP-FAX call (ITU-T T.38) requiring none of the accumulation of the information related to the FAX transmission is set, and the information is not accumulated as in the case of the system shown in FIGS. 1 and 2.

Conversely, the system shown in FIGS. 1 and 2 can also take a configuration, wherein, for instance, the center server 30 (relay means) accumulates the information related to the FAX transmission, and further retransmission request based control using the aforementioned data size information is performed between the center server 30 and the respective virtual FAX devices 40.

Advantages of Embodiment

The present embodiment has advantages which follow.

(1) Cost

The present embodiment has the scheme that the FAX data are transferred by the IP-multicast between the virtual FAX devices, and therefore the system architecture has no necessity of applying a large-sized special device such as the simultaneous broadcast FAX device. Further, the control information and the FAX data to the respective virtual FAX devices on the receiving side are transferred by the IP communications, and it is therefore possible to reduce the cost required for configuring the system. In particular, the virtual FAX device can be actualized only by software (wherein the virtual FAX device is configured by installing a program for functioning as the virtual FAX device into an information processing device (such as a personal computer, etc.) having a communication function). Accordingly, the cost necessary for configuring the system can be reduced.

(2) Size

A real size for installing the system can be decreased because of not utilizing the simultaneous broadcast FAX device.

(3) Performance

If the number of recipients of the FAX data increases, it is enough simply by causing the virtual FAX devices corresponding to the increased recipients to participate in the IP multicast group. Therefore, recipients (devices) that receive the FAX data through the broadcasting transmission can be increased regardless of the performance of the device that performs the IP multicast.

INDUSTRIAL APPLICABILITY

The present invention can be utilized for systems having the VoIP function including the broadcasting function and the FAX communication function that are based on the multicast employing the IP (Internet Protocol) network.

The present invention can be applied to the FAX communication systems utilized preferably for fixed-time communications, communications in emergency, etc. in, for example, large-scale multiple dwelling houses, hospitals, schools or local governments, and so on.

[Others]

The disclosures of international application PCT/JP2003/005273, filed on Apr. 24, 2003 including the specification, drawings and abstract are incorporated herein by reference.

What is claimed is:

1. A broadcast facsimile (FAX) transmission system for broadcasting FAX data from a transmitting-side analog FAX device to a plurality of receiving-side analog FAX devices, comprising:
    a transmitting-side virtual FAX device receiving, from the transmitting-side analog FAX device, information related to a FAX communication to broadcast FAX data to the plurality of receiving-side FAX devices;
    a generating unit generating an IP (Internet Protocol) multicast packet containing the information related to the FAX communication; and
    a relay unit transmitting the IP multicast packet to a multicast group in which a plurality of the receiving-side virtual FAX devices for transmitting the FAX data to the plurality of receiving-side analog FAX devices has been participating,
    wherein the transmitting-side virtual FAX device is connected with the transmitting-side analog FAX device one-to-one, and the plurality of receiving-side virtual FAX devices is respectively connected with the plurality of receiving-side analog FAX devices one-to-one.

2. The broadcast FAX transmission system according to claim 1, wherein the generating unit generates, based on the information related to the FAX communication, an IP multicast packet including control information containing information used for the transmitting-side virtual FAX device to control the plurality of receiving-side virtual FAX devices and an IP multicast packet including FAX data to be transmitted from the transmitting-side FAX device to the plurality of receiving-side analog FAX devices, and the relay unit transmits the IP multicast packets generated by the generating unit to the plurality of receiving-side virtual FAX devices.

3. A broadcast facsimile (FAX) transmission system for broadcasting FAX data from a transmitting-side FAX device to a plurality of receiving-side FAX devices, comprising:
    a transmitting-side virtual FAX device receiving, from the transmitting-side FAX device, information related to a FAX communication to broadcast FAX data to the plurality of receiving-side FAX devices;
    a generating unit generating an IP (Internet Protocol) multicast packet containing the information related to the FAX communication; and
    a relay unit transmitting the IP multicast packet to a multicast group in which a plurality of receiving-side virtual FAX devices for transmitting the FAX data to the plurality of receiving-side FAX devices has been participating,
    wherein the transmitting-side virtual FAX device stores the FAX data to be transmitted from the transmitting-side FAX device to the plurality of receiving-side FAX devices, sets a call for transmitting the FAX data between the transmitting-side virtual FAX device and the plurality of receiving-side virtual FAX devices, and notifies the plurality of receiving-side virtual FAX devices of size information of the stored FAX data, the generating unit generates one or more IP multicast packets for transferring the stored FAX data, the relay unit transmits the one or more IP multicast packets generated by the generating unit to the plurality of receiving-side virtual FAX devices, and the transmitting-side virtual FAX device retransmits one or more IP packets including the FAX data in response to a FAX data retransmission request sent from each of the plurality of receiving-side virtual FAX devices in which judges that a size of the FAX data obtained from the one or more IP multicast packets is not coincident with the size indicated by the size information.

4. A broadcast facsimile (FAX) transmission system for broadcasting FAX data from a transmitting-side FAX device to a plurality of receiving-side FAX devices, comprising:

a transmitting-side virtual FAX device receiving, from the transmitting-side FAX device, information related to a FAX communication to broadcast FAX data to the plurality of receiving-side FAX devices;

a generating unit generating an IP (Internet Protocol) multicast packet containing the information related to the FAX communication; and a relay unit transmitting the IP multicast packet to a multicast group in which a plurality of the receiving-side virtual FAX devices for transmitting the FAX data to the plurality of receiving-side FAX devices has been participating, wherein at least one of the transmitting-side and the receiving-side virtual FAX device is respectively connected with at least one of the transmitting-side FAX device and the receiving-side FAX device one-to-one, and the transmitting-side virtual FAX device, as the transmitting-side FAX device receives information related to a result of the FAX communication via a result notifying unit, notifies the plurality of receiving-side virtual FAX devices of information for transmitting, to said result notifying unit, the information related to the result of the FAX communication between the plurality of receiving-side virtual FAX devices and the plurality of receiving-side FAX devices, the information related to the result of the FAX communication being obtained in the plurality of receiving-side virtual FAX devices.

5. A broadcast facsimile (FAX) transmission system for broadcasting FAX data from a transmitting-side analog FAX device to a plurality of receiving-side analog FAX devices, comprising:

a gateway device terminating an analog FAX communication for transmitting the FAX data with a transmitting-side analog FAX device and converting the analog FAX communication into an IP (Internet Protocol)-FAX communication;

a transmitting-side virtual FAX device terminating the IP-FAX communication converted by the gateway device and converting the IP-FAX communication into an IP communication; and a relay device converting a destination address of an IP packet obtained through the IP communication converted by the transmitting-side virtual FAX device into an IP multicast address of a multicast group in which a plurality of receiving-side virtual FAX devices for transmitting the FAX data to the plurality of receiving-side analog FAX devices has been participating, and sending the IP packet to the plurality of receiving-side virtual FAX devices, wherein the transmitting-side analog FAX device is connected with the transmitting-side virtual FAX device one-to-one through the gateway device, the gateway device is connected with the transmitting-side analog FAX device one-to-one, the transmitting-side virtual FAX is connected with the gateway device one-to-one, and the plurality of receiving-side virtual FAX devices is respectively connected with the plurality of receiving-side analog FAX devices one-to-one.

* * * * *